(12) United States Patent
Smith et al.

(10) Patent No.: US 11,797,161 B2
(45) Date of Patent: Oct. 24, 2023

(54) SYSTEMS FOR GENERATING SEQUENTIAL SUPPORTING ANSWER REPORTS

(71) Applicant: Adobe Inc., San Jose, CA (US)

(72) Inventors: Kevin Gary Smith, Lehi, UT (US); William Brandon George, Pleasant Grove, UT (US); Vishwa Vinay, Bangalore (IN); Iftikhar Ahamath Burhanuddin, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/114,084

(22) Filed: Feb. 24, 2023

(65) Prior Publication Data

US 2023/0214100 A1 Jul. 6, 2023

Related U.S. Application Data

(63) Continuation of application No. 16/896,820, filed on Jun. 9, 2020, now Pat. No. 11,630,558.

(51) Int. Cl.
*G06F 16/338* (2019.01)
*G06F 3/04842* (2022.01)
*G06F 40/30* (2020.01)
*G06F 40/35* (2020.01)
*G06F 16/332* (2019.01)
*G06F 40/40* (2020.01)

(52) U.S. Cl.
CPC ...... *G06F 3/04842* (2013.01); *G06F 16/3328* (2019.01); *G06F 40/30* (2020.01); *G06F 40/35* (2020.01); *G06F 40/40* (2020.01)

(58) Field of Classification Search
CPC .. G06F 3/04842; G06F 16/3328; G06F 40/35; G06F 40/40; G06F 40/30
See application file for complete search history.

(56) References Cited

U.S. PATENT DOCUMENTS

| | | | |
|---|---|---|---|
| 11,030,255 | B1 | 6/2021 | Tory et al. |
| 11,055,489 | B2 | 7/2021 | Djalali et al. |
| 11,630,558 | B2 | 4/2023 | Smith et al. |
| 2016/0140123 | A1 | 5/2016 | Chang et al. |
| 2018/0089305 | A1* | 3/2018 | Croutwater ......... G06F 16/3334 |

(Continued)

OTHER PUBLICATIONS

U.S. Appl. No. 16/896,820 , "Notice of Allowance", U.S. Appl. No. 16/896,820, dated Jan. 11, 2023, 8 pages.

*Primary Examiner* — Haoshian Shih
(74) *Attorney, Agent, or Firm* — FIG. 1 Patents

(57) ABSTRACT

In implementations of systems for generating sequential supporting answer reports, a computing device implements a report system to receive a user input defining a question with respect to a visual representation of analytics data rendered in a user interface. The report system determines a final answer to the question by processing a semantic representation of the question using a machine learning model. A sequence of reports is generated and the sequence defines an order of progression from a first supporting answer to the final answer. Each report of the sequence of reports includes a visual representation of a supporting answer to the question. The report system displays a dashboard in the user interface including a first report of the sequence of reports, the first report depicting a visual representation of the first supporting answer to the question.

20 Claims, 14 Drawing Sheets

(56) References Cited

U.S. PATENT DOCUMENTS

| | | |
|---|---|---|
| 2019/0138648 A1 | 5/2019 | Gupta et al. |
| 2019/0392066 A1 | 12/2019 | Kim et al. |
| 2021/0382607 A1 | 12/2021 | Smith et al. |
| 2022/0222956 A1 | 7/2022 | Sharma et al. |

* cited by examiner

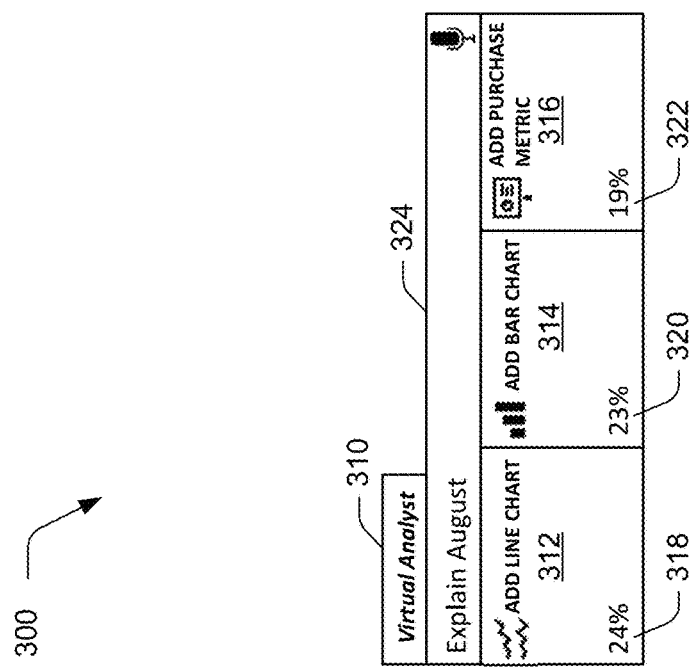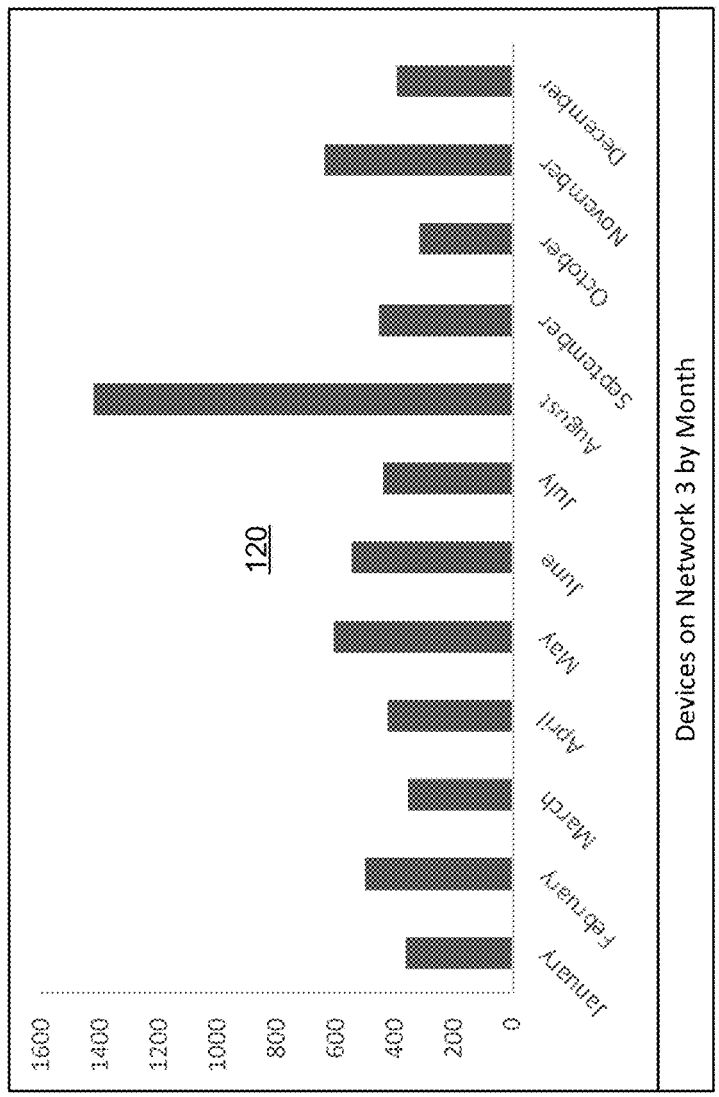
Fig. 3A

400

402
Receive a user input defining a question with respect to a visual representation of analytics data rendered in a user interface

404
Generate a semantic representation of the question, the semantic representation describing a relationship between terms of the question

406
Determine a final answer to the question by processing the semantic representation of the question using a machine learning model

408
Generate a sequence of reports, the sequence defining an order of progression from a first supporting answer to the final answer, each report of the sequence including a visual representation of a supporting answer to the question

408
Display a dashboard in the user interface including a first report of the sequence of reports, the first report depicting a visual representation of the first supporting answer and an indication of a relationship between the first supporting answer and the final answer to the question

*Fig. 4*

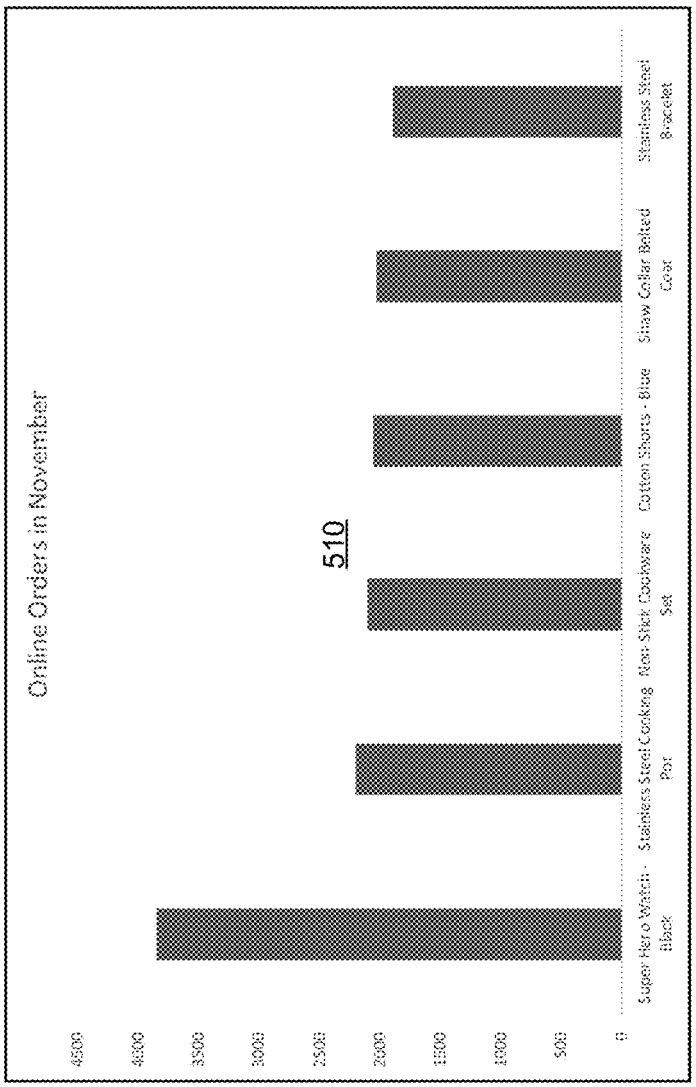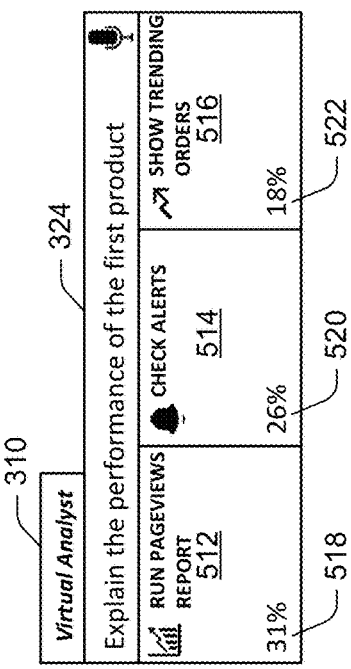
Fig. 5A

SYSTEMS FOR GENERATING SEQUENTIAL SUPPORTING ANSWER REPORTS

RELATED APPLICATIONS

This application is a continuation of and claims priority to U.S. patent application Ser. No. 16/896,820, filed Jun. 9, 2020, entitled "Systems for Generating Sequential Supporting Answer Reports," the entire disclosure of which is hereby incorporated by reference herein in its entirety.

BACKGROUND

Digital analytics systems are implemented to analyze data (e.g., petabytes of data) to gain insights that are not possible to obtain solely by human users. These systems utilize machine learning and statistical modeling to process large amounts of the data and generate predictions on the processed data. By leveraging the machine learning and the statistical modeling in this manner, conventional digital analytics systems generate the predictions as outputs based on user defined inputs.

In one such example, a conventional digital analytics system receives a natural language question as an input and the system generates an answer to the question as an output, for example, using the machine learning and/or the statistical modeling. In this example, the conventional digital analytics system receives the input as a natural language question such as "which network switch is the most likely to fail?" In response to receiving this input, the digital analytics system generates an output (e.g., using the machine learning and/or statistical modeling) as a natural language answer such as "network switch 18 has a 72% probability of failure within two weeks."

These conventional systems, however, are limited to generating a single answer in response to receiving a user input defining a question. For example, conventional digital analytics systems are not capable of generating an explanation of a logical path from the received question to the generated answer. This is because the generated answer often corresponds to a highest scoring candidate of multiple candidate answers and the scores are determined using techniques which are not directly understandable to a user (e.g., based on weights of parameters of a model). Because conventional systems are limited in this manner, a variety of insights into reasons for the generated answer remain hidden to users of the conventional systems.

SUMMARY

Systems and techniques are described for generating sequential supporting answer reports. A digital analytics system receives user inputs defining questions and the analytics system generates answers to the questions as outputs. In an example, a computing device implements a report system to receive a user input defining a question with respect to a visual representation of analytics data rendered in a user interface. The report system determines a final answer to the question by processing a semantic representation of the question using a machine learning model.

A sequence of reports is generated which defines an order of progression from a first supporting answer to the final answer. Each of these reports includes a visual representation of a supporting answer to the question. The report system displays a dashboard in the user interface including a first report of the sequence of reports. The first report depicts a visual representation of the first supporting answer to the question and an indication of a relationship between the first supporting answer and the final answer to the question.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIGS. 3A, 3B, 3C, 3D, and 3E are illustrations of example representations of sequential supporting answer reports.

FIG. 4 is a flow diagram depicting a procedure in an example implementation in which a user input defining a question with respect to a visual representation of analytics data is received and a sequence of reports is generated such that each report in the sequence of reports includes a visual representation of a supporting answer to the question.

DETAILED DESCRIPTION

Overview

Figure 1:
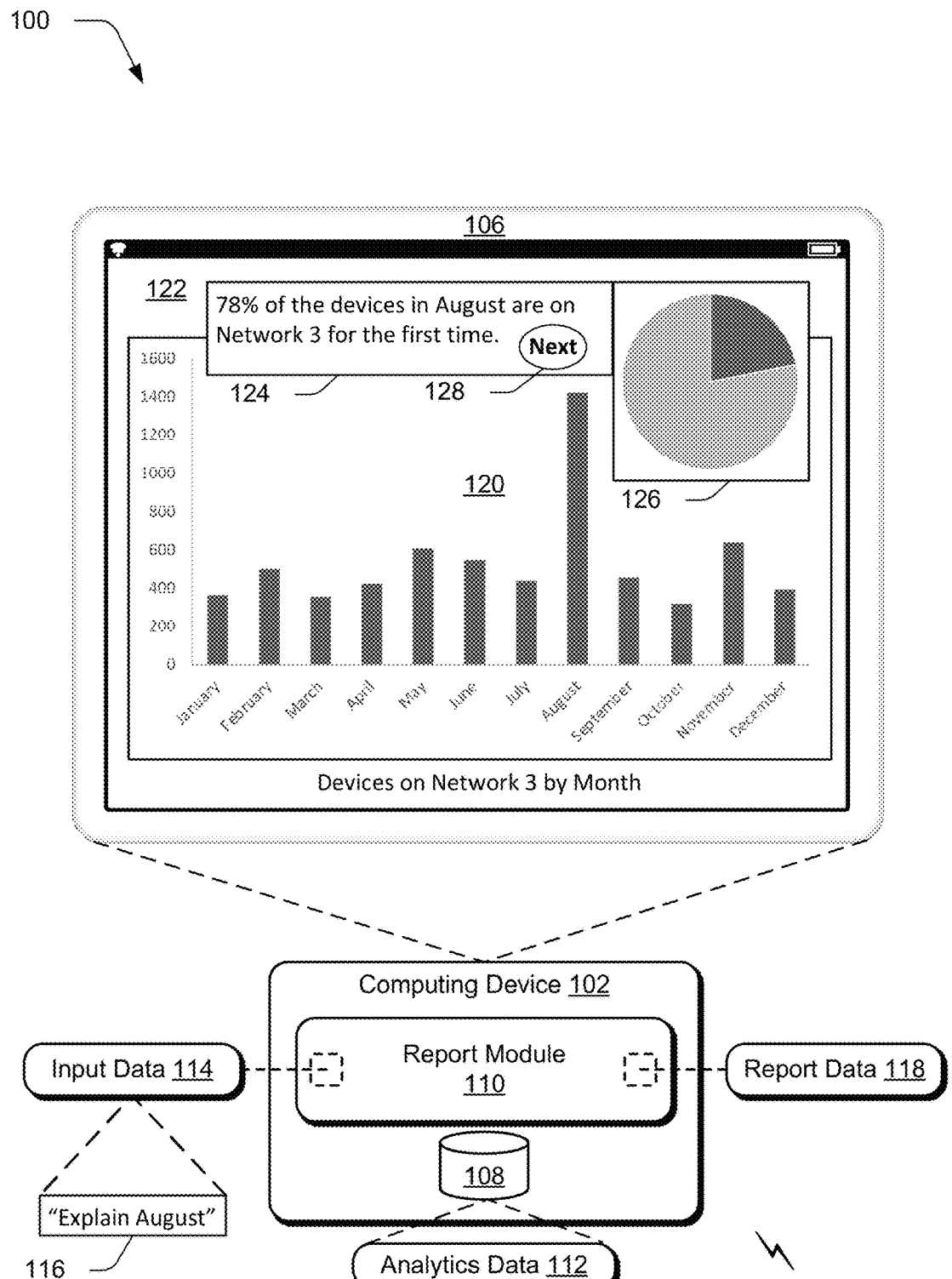
FIG. 1 is an illustration of an environment in an example implementation that is operable to employ digital systems and techniques for generating sequential supporting answer reports as described herein.

Digital analytics systems utilize machine learning and/or statistical modeling to process large amounts of data and generate predictions based on the processed data. These predictions can be generated in the form of natural language answers to natural language questions about representations of the data defined by user inputs. For example, a digital analytics system may receive a user input defining a natural language question such as "why did carbon dioxide emissions decrease in April?" In response to receiving the user input, the digital analytics system processes the data (e.g., using the machine learning and/or statistical modeling) to generate a natural language answer such as "the decrease in carbon dioxide emissions corresponds to government mandated quarantines restricting travel of most citizens to prevent spread of an infectious disease."

Conventional digital analytics systems, however, are limited to generating a single answer in response to receiving a user input defining a question. As a result of this limitation, conventional systems are not capable of explaining how a user would logically progress through intermediate information related to the final answer in order to reach the final answer. This is because the generated answer often corresponds to a highest scoring candidate of multiple candidate answers to the question. For example, scores for candidate answers may be determined by conventional systems using techniques which are not directly understandable by a human user (e.g., based on weights of parameters of a model). Because conventional digital analytics systems are limited in this manner, a variety of insights into reasons for the generated answer remain hidden to users of the conventional systems.

To overcome these limitations, systems and techniques are described for generating sequential supporting answer reports. In one example, a computing device implements a report system to receive a user input defining a question with respect to a visual representation of analytics data rendered in a user interface. The user input can be received via a user interface component as an audio input or a textual input defining the question in a natural language.

The report system determines a final answer to the question by processing a semantic representation of the question using machine learning and/or statistical modeling. This semantic representation indicates a relationship between terms of the question. The report system generates a sequence of supporting answer reports is which defines an order of progression from a first supporting answer to the final answer. Each of these reports includes a visual representation of a supporting answer to the question.

The report system displays a dashboard in the user interface including a first report of the sequence of reports. The first report depicts a visual representation of the first supporting answer to the question and an indication of a relationship between the first supporting answer and the final answer to the question. This relationship suggests how the first supporting answer contributes to a portion of the final answer. The relationship also provides a supporting explanation of the final answer to the question which is not possible in conventional digital analytics systems.

Consider an example of a sequence of supporting answers to the natural language question of "why did carbon dioxide emissions decrease in April?" A first supporting answer to this question may be generated as "most carbon dioxide emissions caused by humans are related to emissions from traveling to school and work." A second supporting answer to the question can be generated as "several days of restricted travel by most citizens would result in a noticeable decrease in carbon dioxide emissions." In this example, the first and second supporting answers provide a logical progression to a final answer to the question of "the decrease in carbon dioxide emissions corresponds to government mandated quarantines restricting travel of most citizens to prevent spread of an infectious disease." These supporting answers also provide additional insight which may not be fully obtainable from the final answer alone. For example, the supporting answers clarify that the carbon dioxide emissions decreased in April because of the travel restrictions rather than, for example, a decrease in electric power generation due to the government mandated quarantines.

The described systems improve conventional digital analytics systems which are limited to generating a single answer in response to receiving a user input defining a question. By generating a sequence of supporting answer reports, the described systems provide additional insight into how the supporting answers individually contribute to the final answer. The sequence of supporting answer reports also provides a logical progression to the final answer which is not possible using conventional techniques. The reports can additionally expose functionality of the described systems such as how an analytics tool is usable to generate a supporting answer to the question as depicted in a report of the sequence of reports.

Term Descriptions

As used herein, the term "machine learning model" refers to a computer representation that can be tuned (e.g., trained) based on inputs to approximate unknown functions. By way of example, the term "machine learning model" can include a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, or reinforcement learning. For example, the machine learning model can include, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

As used herein, the term "semantic representation" refers to a data structure that describes terms of a natural language question and a relationship between the terms. By way of example, a semantic representation may be structured in a form of a triple that includes three elements such as two elements each representing a term of a natural language question and a third element representing a relationship between the terms. By way of additional example, a semantic representation may be structured in a form that includes more than three elements.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and a report module 110. The storage device 108 is illustrated to include analytics data 112 which is to be analyzed by the report module 110.

The report module 110 is illustrated as having, transmitting, and/or receiving input data 114. The input data 114 describes user inputs such as a natural language question 116 which may be an audio input or a textual input. In the illustrated example, the natural language question 116 is "Explain August." The input data 114 may also include context data which describes interactions of a user or many users with the analytics data 112. The context data can include technology data, user profile data, application data, behavioral data, and so forth.

Examples of information described by technology data include a type of operating system of a client device, a screen resolution of the client device, a browser type of the client device, whether the client device has JavaScript enabled, whether the client device accepts cookies, etc. For example, user profile data describes a user ID associated with the client device, geographic information (e.g., country, city, and zip code), dates and times of logins, numbers of interactions and/or visits, and so forth. Application data may describe a page or a section, a tool or a feature used or being used, version information, product information, etc. Examples of information described by behavioral data include search terms, a referrer type, a visit depth, a visit path, a number of clicks, and so forth.

The context data may also include device data and/or diagnostic data. Examples of information described by device data may include a device type (e.g. mobile, tablet, or desktop), hardware specifications, device manufacturer information, cumulative operational time, etc. Examples of information described by diagnostic data can include incident reports, maintenance information, simulation outputs, and data received from sensors such as thermocouples, fan sensors, humidity sensors, and so forth.

The computing device 102 implements the report module 110 to process the input data 114 and the analytics data 112 to generate report data 118. To do so, the report module 110 processes the input data 114 that describes the natural language question 116 with respect to a visual representation 120 of the analytics data 112 which is rendered in a user interface 122 of the display device 106. As shown, the visual representation 120 includes a bar graph of "Devices on Network 3 by Month." The report module 110 processes the input data 114 and the analytics data 112 to determine a final answer to the natural language question 116 of "Explain August."

The report module 110 also determines a first supporting answer to the natural language question 116 of "Explain August." The report module 110 then generates a sequence of reports that defines a progression from the first supporting answer to the final answer and each report of the sequence includes a visual representation of a supporting answer to the natural language question 116. The computing device 102 implements the report module 110 to generate the report data 118 as describing the sequence of reports.

A first report 124 of the sequence of reports is displayed in the user interface 122 of the display device 106. As shown, the first report 124 depicts a visual representation 126 of the first supporting answer and an indication of a relationship between the first supporting answer and the final answer to the question. This indication of the relationship includes a natural language explanation of the visual representation 126 of the first supporting answer as "78% of the devices in August are on Network 3 for the first time." Thus, the relationship between the first supporting answer and the final answer to the natural language question 116 of "Explain August" is that the significant number of devices on Network 3 for the first time accounts for a significant increase in numbers of devices on Network 3 in August as shown in the visual representation 120.

The first report 124 also includes a user interface instrumentality 128 which depicts the word "Next." For example, an interaction with the user interface instrumentality 128 is effective to display an additional report of the sequence of reports in the user interface 122. In response to receiving an indication of an interaction with the user interface instrumentality 128, the report module 110 renders the additional report to replace the first report 124 in the user interface 122. By displaying these reports sequentially, the report module 110 exposes a logical progression from the visual representation 126 of the first supporting answer to the final answer to the question.

Figure 2:
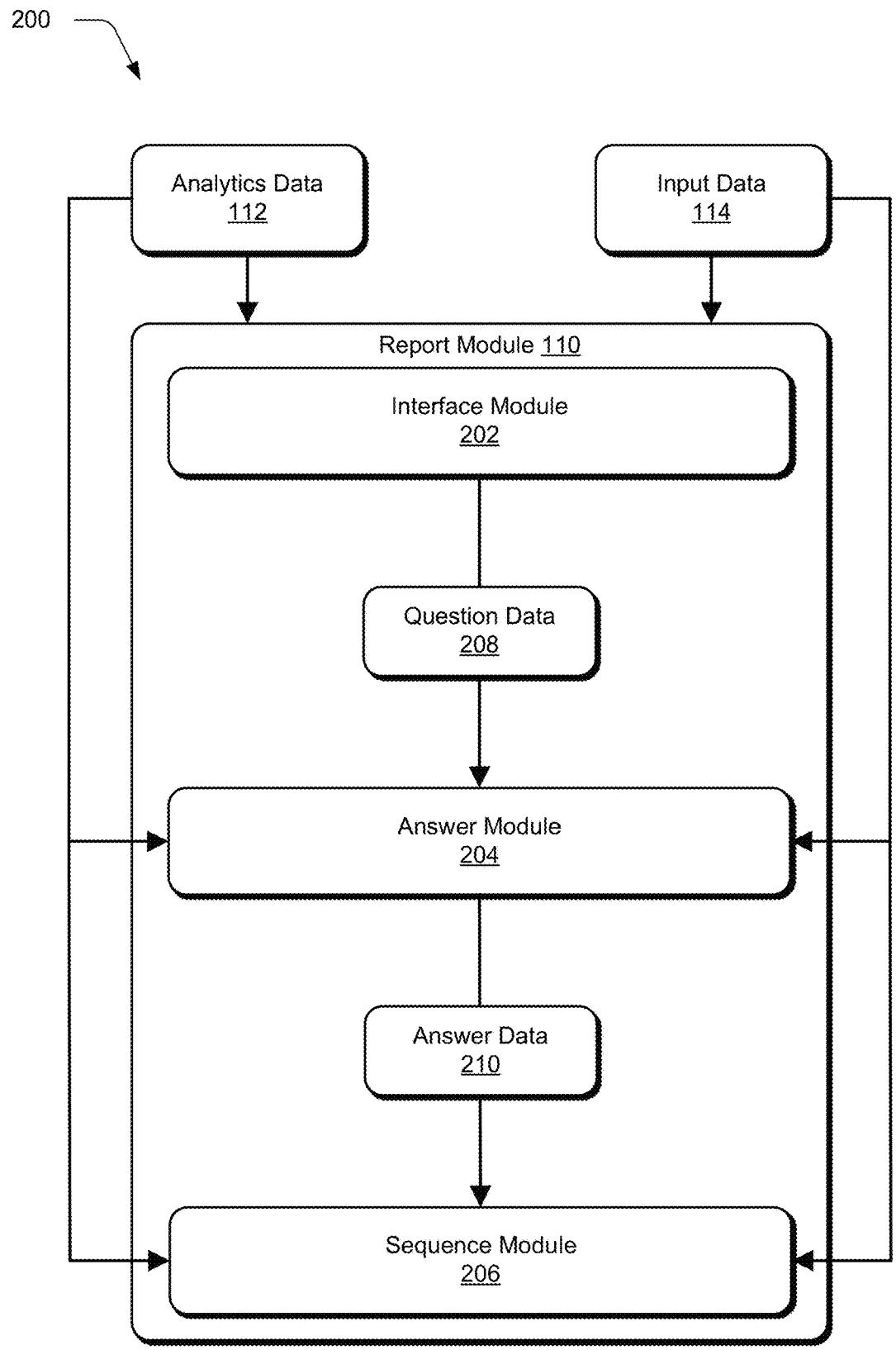
FIG. 2 depicts a system in an example implementation showing operation of a report module for generating sequential supporting answer reports.

FIG. 2 depicts a system 200 in an example implementation showing operation of a report module 110. The report module 110 is illustrated to include an interface module 202, an answer module 204, and a sequence module 206. As shown, the interface module 202 receives the analytics data 112 and the input data 114. In one example, the interface module 202 processes the input data 114 and/or the analytics data 112 to generate question data 208.

Figure 3B:
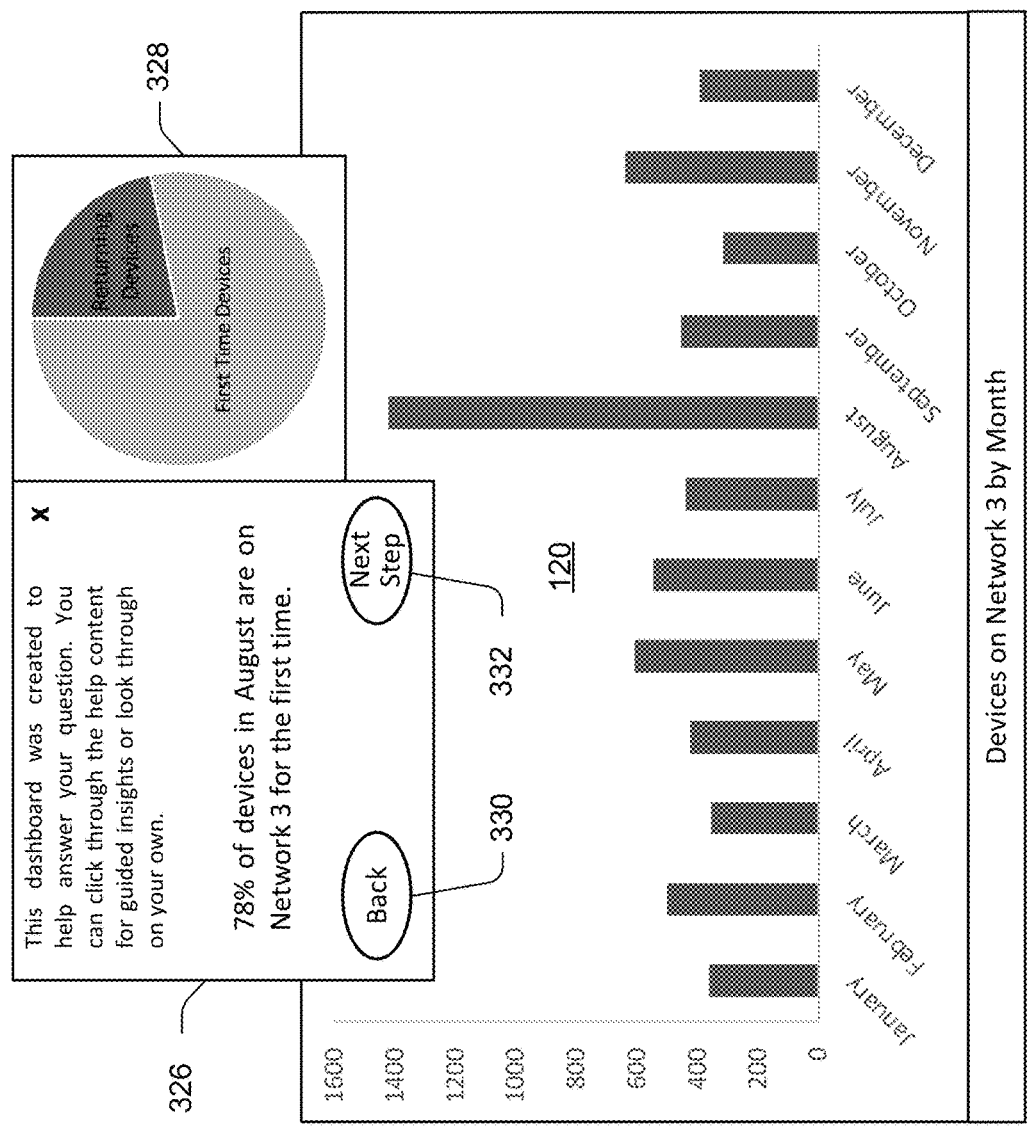
Figure 3C:
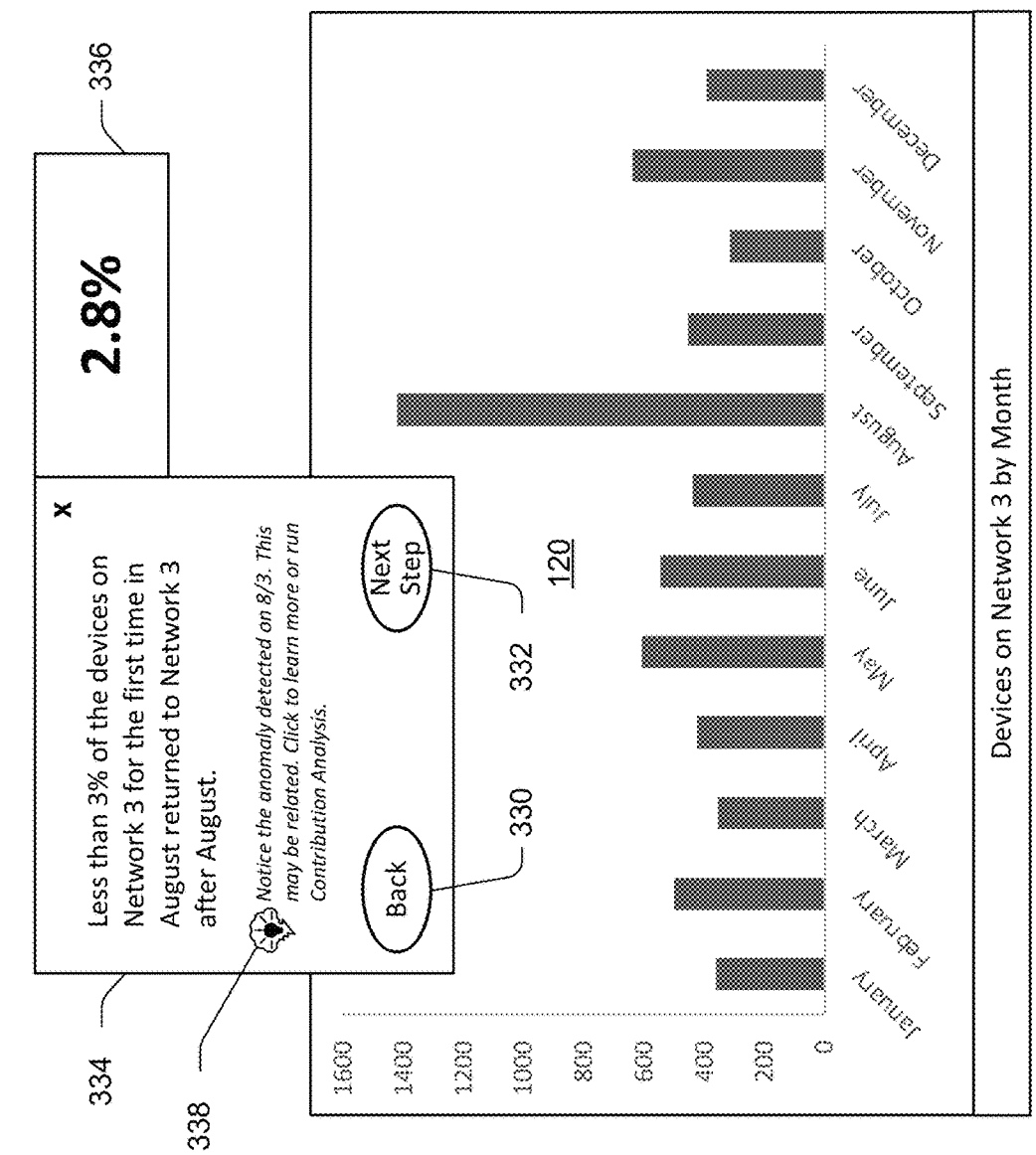
Figure 3D:
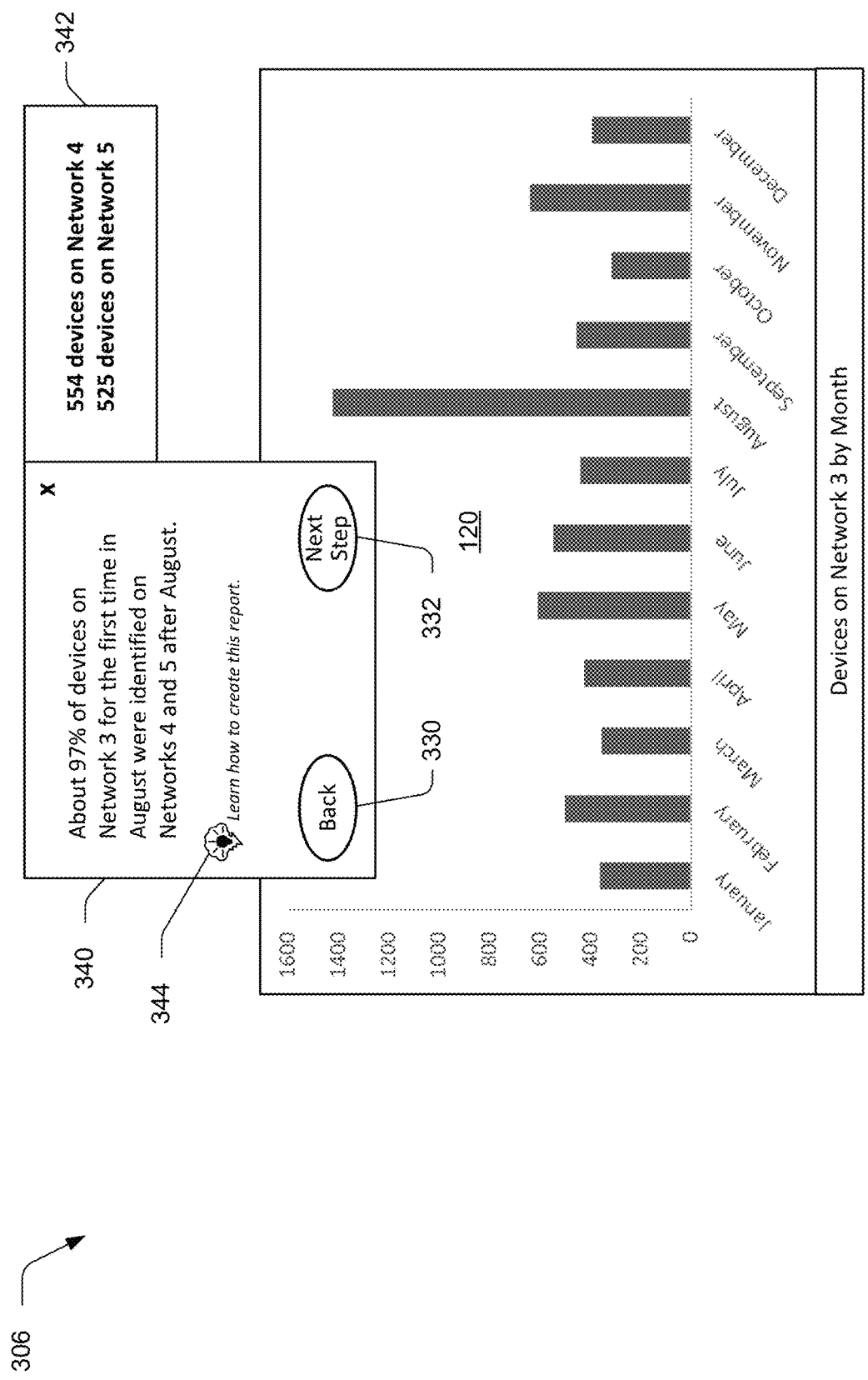
Figure 3E:
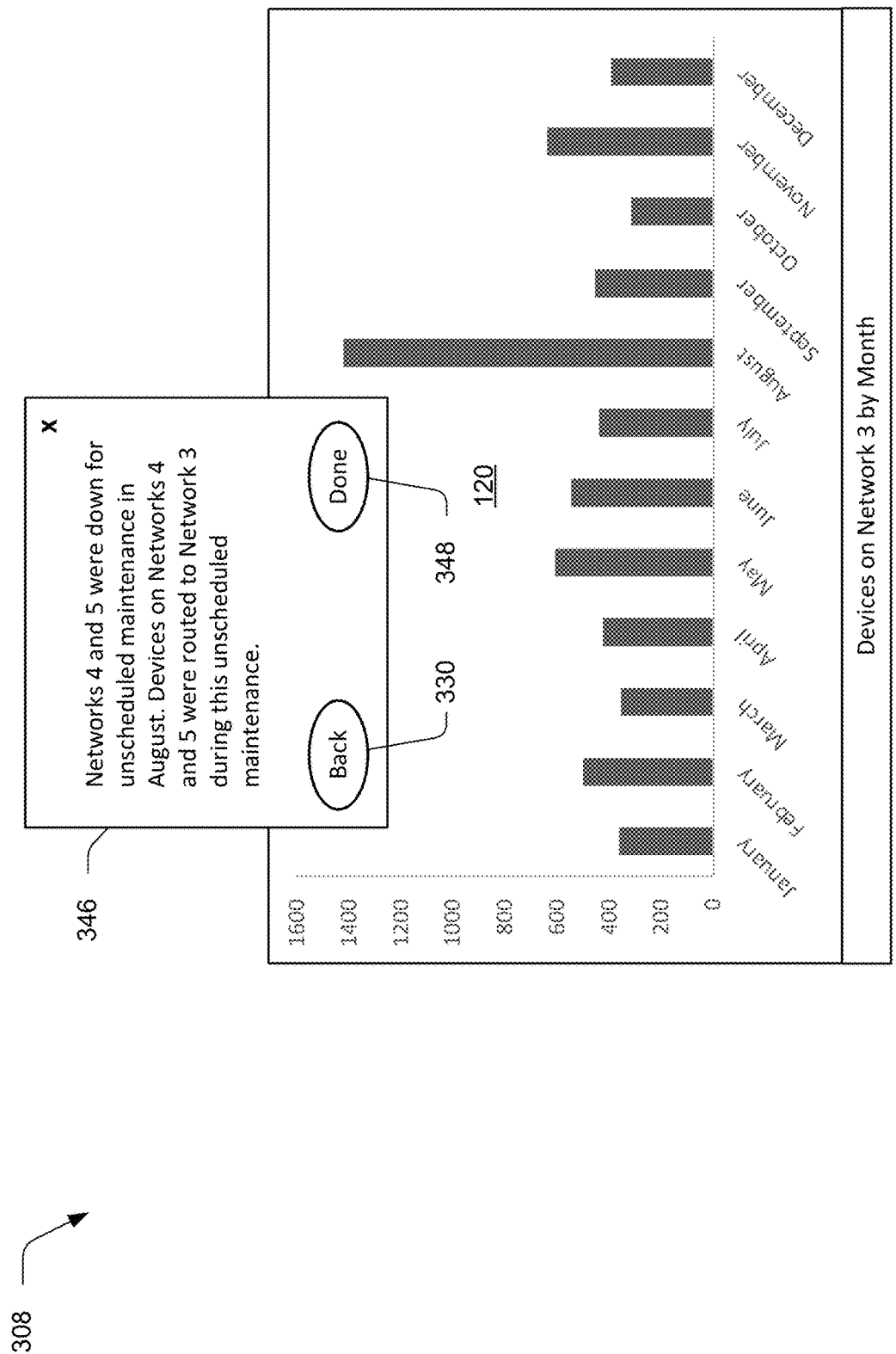

FIGS. 3A, 3B, 3C, 3D, and 3E are illustrations of example representations of sequential supporting answer reports. FIG. 3A illustrates an example representation 300 in which a user input is received as a question with respect to the visual representation 120 of the analytics data 112. FIG. 3B illustrates an example representation 302 in which a dashboard is displayed including a first report of a sequence of supporting answer reports. FIG. 3C illustrates an example representation 304 in which the dashboard includes a second report of the sequence of supporting answer reports. FIG. 3D illustrates an example representation 306 in which the dashboard includes a third report of the sequence of supporting answer reports. FIG. 3E illustrates an example representation 308 in which the dashboard includes a fourth report of the sequence of supporting answer reports.

As shown in FIG. 3A, the computing device 102 implements the interface module 202 to render a user interface component 310 in the representation 300. The user interface component 310 includes recommendations 312-316 for modifying the visual representation 120 of the analytics data 112. The user interface component 310 also depicts relevancy scores 318-322 which correspond to the recommendations 312-316, respectively. For example, recommendation 312 suggests "ADD LINE CHART" which has the relevancy score 318 of 24%. Recommendation 314 suggests "ADD BAR CHART" which has the relevancy score 320 of 23%. Recommendation 316 suggests "ADD PURCHASE METRIC" which has the relevancy score 322 of 19%. For example, the interface module 202 determines the relevancy scores 318-322 by processing the input data 114 and/or the analytics data 112 using a machine learning model which can include multiple machine learning models. In another example, the interface module 202 determines the relevancy scores 318-322 using statistical modeling and/or machine learning.

As further shown in FIG. 3A, the user interface component 310 includes a user input field 324 for receiving a user input defining a question in natural language with respect to the visual representation 120 of the analytics data 112. The user input field 324 can receive this natural language question as an audio input and/or as a textual input. As shown, the user input field 324 has received the user input as the natural language question "Explain August." The interface module 202 generates the question data 208 to describe the natural language question.

In one example, the interface module 202 generates a semantic representation for the natural language question which indicates a relationship between terms in the natural language question. This may include triples in a form of (action, role, value) such that the action in each triple includes an action term in the natural language question, the value in each triple includes a term in the natural language question, and the role of each triple indicates a role of the value with respect to the action. In another example, the interface module 202 generates the semantic representation for the natural language question as including triples in a form of (subject, predicate, object) such that the subject in each triple includes a subject term in the natural language question, the object in each triple includes an object term in the natural language question, and the predicate in each triple includes a term in the natural language question linking the subject term and the object term. For example, the interface module 202 generates the question data 208 as describing the semantic representation for the natural language question "Explain August."

As illustrated in FIG. 2, the answer module 204 receives the question data 208. In one example, the answer module 204 also receives the analytics data 112 and the input data 114. The answer module 204 processes the question data 208, the analytics data 112, and/or the input data 114 to generate answer data 210. For example, the answer module 204 includes a machine learning model or multiple machine learning models and the answer module 204 generates the answer data 210 by processing the question data 208, the analytics data 112, and/or the input data 114 using the machine learning model or models. In an example, the answer module 204 generates the answer data 210 by processing the question data 208, the analytics data 112, and/or the input data 114 using statistical modeling and/or machine learning.

In one example, the answer module 204 obtains candidate natural language answers from the analytics data 112 for the natural language question described by the question data 208. For example, the answer module 204 generates semantic representations for the candidate answers which indicate relationships between terms of the candidate answers. In an example, this can include triples in a form of (action, role, value) such that the action in each triple includes an action term in a candidate answer, the value in each triple includes a term in the candidate answer, and the role of each triple indicates a role of the value with respect to the action. In another example, this can include triples in a form of (subject, predicate, object) such that the subject in each triple includes a subject term in a candidate answer, the object in each triple includes an object term in the candidate answer, and the predicate in each triple includes a term in the candidate answer linking the subject term and the object term.

The answer module 204 generates match scores for the candidate answers using the semantic representation of the question and the semantic representations of the candidate answers. For example, the answer module 204 determines alignment scores between the question triples and the candidate answer triples and uses weighted averages of these alignment scores to generate the match scores. The answer module 204 selects a candidate answer having a highest match score as a final answer to the natural language question. The answer module 204 then generates the answer data 210 as describing a final answer to the natural language question "Explain August."

The sequence module 206 receives the answer data 210 describing the final answer to the question with respect to the visual representation 120 of the analytics data 112. In one example, the sequence module 206 also receives the analytics data 112 and the input data 114. The sequence module 206 processes the answer data 210, the analytics data 112, and/or the input data 114 to generate the report data 118. For example, the sequence module 206 generates a first supporting answer to the natural language question "Explain August." The sequence module 206 then generates a sequence of reports that defines a progression from the first supporting answer to the final answer and each report of the sequence includes a visual representation of a supporting answer to the natural language question. In an example, the sequence module 206 generates the report data 118 as describing the sequence of reports.

FIG. 3B illustrates a first report 326 of the sequence of reports described by the report data 118. This first report 326 depicts the first supporting answer to the natural language question "Explain August." The first report 326 also includes a visual representation 328 of the first supporting answer and an indication of a relationship between the first supporting answer and the final answer to the question. The indication of the relationship includes a natural language explanation of the visual representation of the first supporting answer. In this example, the explanation is "78% of devices in August are on Network 3 for the first time." The relationship between the first supporting answer and the final answer the natural language question of "Explain August" is that the significant number of devices on Network 3 for the first time accounts for a significant increase in numbers of devices on Network 3 in August as depicted in the visual representation 120.

As shown in FIG. 3B, the first report 326 includes user interface instrumentalities 330, 332. The user interface instrumentality 330 depicts the word "Back" and the user interface instrumentality 332 depicts the words "Next Step." In one example, an interaction with the user interface instrumentality 330 is effective to render the user interface component 310 in the representation 302. Interaction with the user interface instrumentality 332 is effective to display a next report of the sequence of reports described by the report data 118. In response to receiving a user input as an interaction with the user interface instrumentality 332, the report module 110 renders a second report 334 of the sequence of reports described by the report data 118.

The representation 304 depicted in FIG. 3C includes the second report 334 which displays a second supporting answer to the natural language question "Explain August." The second report 334 includes a visual representation 336 of the second supporting answer and an indication of a relationship between the second supporting answer and the final answer to the question. The indication of the relationship includes a natural language explanation of the visual representation of the second supporting answer. As shown in FIG. 3C, this explanation is "Less than 3% of the devices on Network 3 for the first time in August returned to Network 3 after August."

In the illustrated example, the second supporting answer is dependent on the first supporting answer to the question. This is because the first supporting answer identifies the devices on Network 3 for the first time in August and the second supporting answer includes additional information which augments the information included in the first supporting answer. In other examples, the second supporting answer to the question does not depend on the first supporting answer. For example, the second supporting answer could include information that is not related to the devices on Network 3 for the first time in August. In this example, the second supporting answer could include information about devices on Network 3 before August such as a number of devices on Network 3 for the first time in July.

The second report 334 also includes an indication 338 of additional information including "Notice the anomaly detected on 8/3. This may be related. Click to learn more or run Contribution Analysis." In one example, the report module 110 includes the indication 338 as part of the second report 334 based on the input data 114 and/or the analytics data 112. In this example, processing of the input data 114 and/or the analytics data 112 may suggest that a user associated with the input data 114 is under experienced using "Contribution Analysis." Thus, the report module 110 generates the sequence of reports not only to sequentially provide supporting answers to the question "Explain August" but also to expose additional functionality made available by the report module 110.

The second report 334 also includes the user interface instrumentalities 330, 332. For example, an interaction with the user instrumentality 330 is effective to display the first report 326. Interaction with the user instrumentality 332 is effective to display a next report of the sequence of reports described by the report data 118. In response to receiving a user input as an interaction with the user interface instrumentality 332, the report module 110 renders a third report 340 of the sequence of reports.

FIG. 3D depicts the representation 306 which includes the third report 340. The representation 306 also includes a visual representation 342 of a third supporting answer to the natural language question "Explain August" and an indication of a relationship between the third supporting answer and the final answer to the question. The indication of the relationship is a natural language explanation of the visual representation 342 which is "About 97% of devices on Network 3 for the first time in August were identified on Networks 4 and 5 after August."

This third report 340 also includes an indication 344 of additional information of "Learn how to create this report." In one example, the report module 110 includes the indication 344 as part of the third report 340 based on the input data 114 and/or the analytics data 112. For example, the report module 110 can determine that a user associated with the input data 114 has not created the report and that users determined similar to the user frequently create the report while interacting with the analytics data 112.

The third report 340 also includes the user interface instrumentalities 330, 332. In one example, an interaction with the user instrumentality 330 is effective to display the second 334 report. Interaction with the user instrumentality 332 is effective to display a next report of the sequence of reports described by the report data 118. In response to receiving a user input as an interaction with the user interface instrumentality 332, the report module 110 renders a fourth report 346 of the sequence of reports.

As shown in FIG. 3E, the forth report 346 includes a fourth supporting answer to the question of "Explain August." The fourth supporting answer depicts a natural language explanation of "Networks 4 and 5 were down for unscheduled maintenance in August. Devices on Networks 4 and 5 were routed to Network 3 during this unscheduled maintenance." In the illustrated example, the sequence of reports 326-346 now collectively indicates the final answer to the question.

In response to receiving a user input as an interaction with the user interface instrumentality 330, the report module 110 renders the third report 340, the second report 334, and/or the first report 326 of the sequence of reports. In this way, the relationships between the supporting answers to the question and the final answer to the question are further observable. For example, "78% of devices in August are on Network 3 for the first time" because these devices were nearly all on Networks 4 or 5 prior to August.

When Networks 4 and 5 were down for unscheduled maintenance in August, the devices on these networks were routed to Network 3 which explains the significant increase of devices on Network 3 in August. Upon completion of the unscheduled maintenance in August, many of the devices on Network 3 returned to Networks 4 and 5 which explains the absence of these devices on Network 3 after August. The report module 110 receives a user input as an interaction with user interface instrumentality 348, and this interaction is effective to end the sequence of supporting answer reports.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-3. FIG. 4 is a flow diagram depicting a procedure 400 in an example implementation in which a user input defining a question with respect to a visual representation of analytics data is received and a sequence of reports is generated such that each report in the sequence of reports includes a visual representation of a supporting answer to the question.

A user input defining a question with respect to a visual representation of analytics data rendered in a user interface is received (block 402). The computing device 102 implements the report module 110 to receive the user input defining the question in one example. A semantic representation of the question is generated (block 404), the semantic representation describing a relationship between terms of the question. For example, the report module 110 generates the semantic representation of the question.

A final answer to the question is determined by processing the semantic representation of the question using a machine learning model (block 406). For example, the report module 110 determines the final answer to the question. A sequence of reports is generated (block 408), the sequence defining an order of progression from a first supporting answer to the final answer, each report of the sequence including a visual representation of a supporting answer to the question. In one example, the report module 110 generates the sequence of reports. A dashboard is displayed in the user interface including a first report of the sequence of reports (block 410), the first report depicting a visual representation of the first supporting answer and an indication of a relationship between the first supporting answer and the final answer to the question. The computing device 102 implements the report module 110 to display the dashboard including the first report in one example.

Figure 5B:
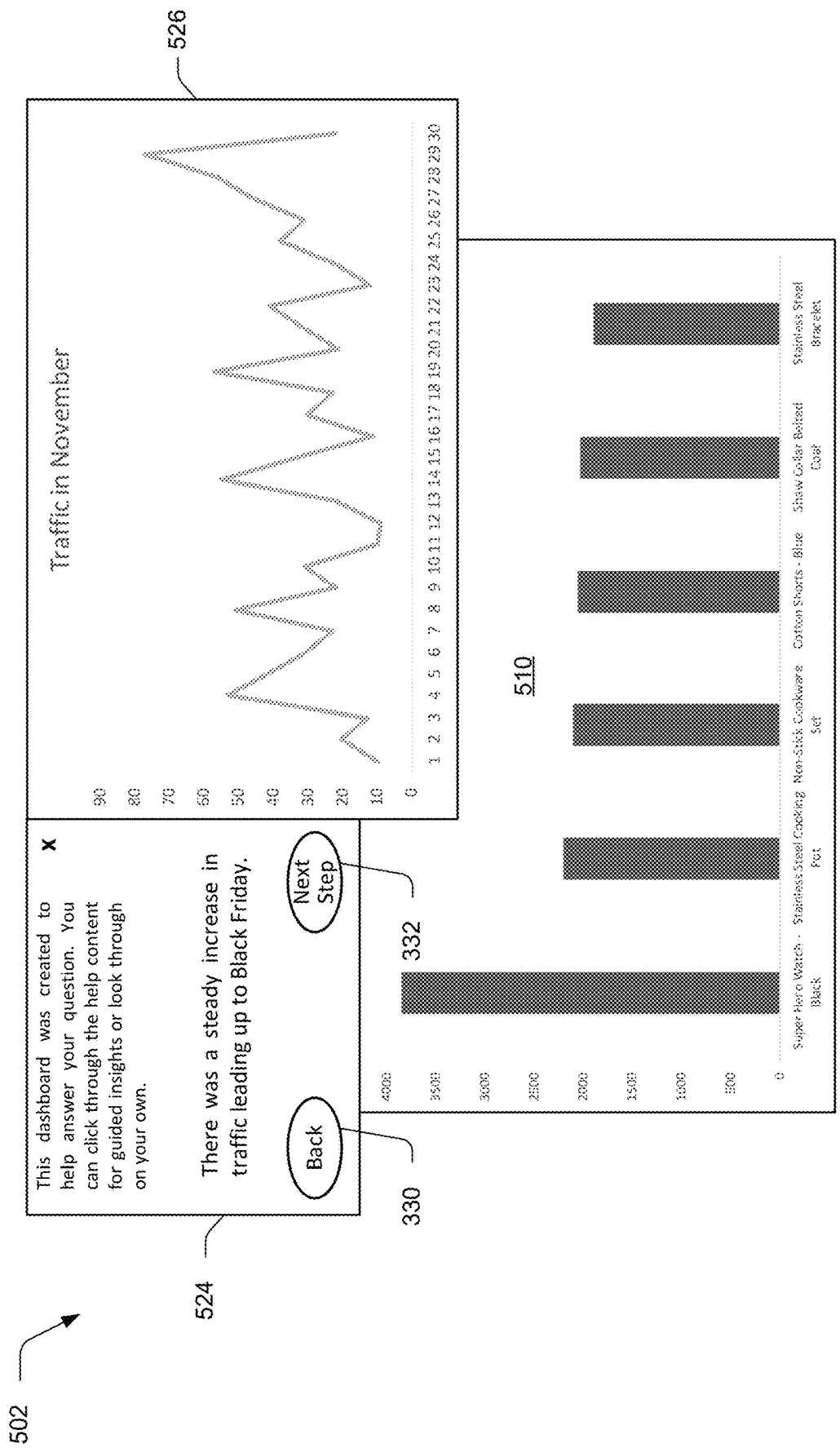
FIGS. 5A, 5B, 5C, 5D, and 5E are illustrations of example representations of sequential supporting answer reports.
Figure 5C:
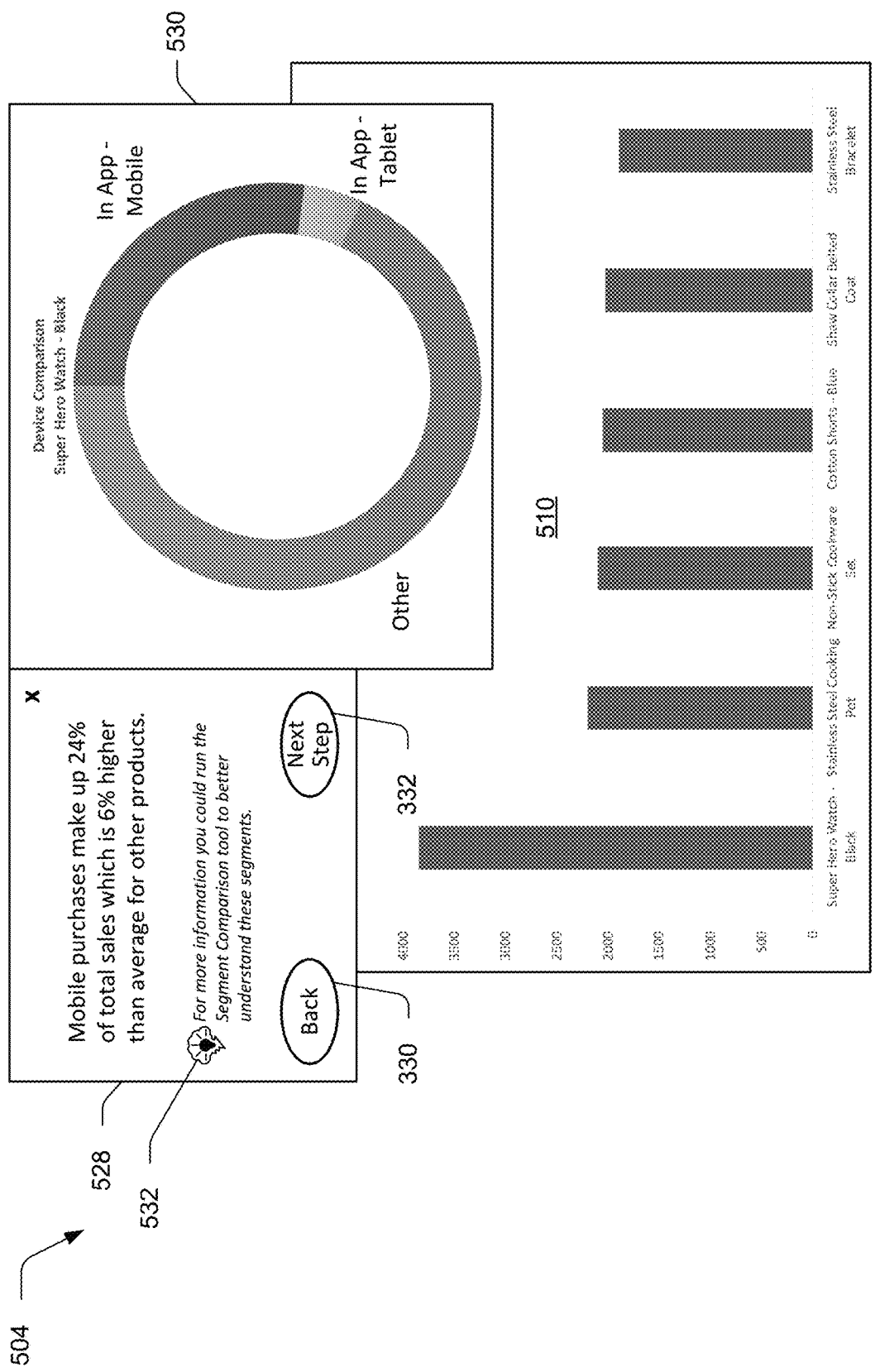
Figure 5D:
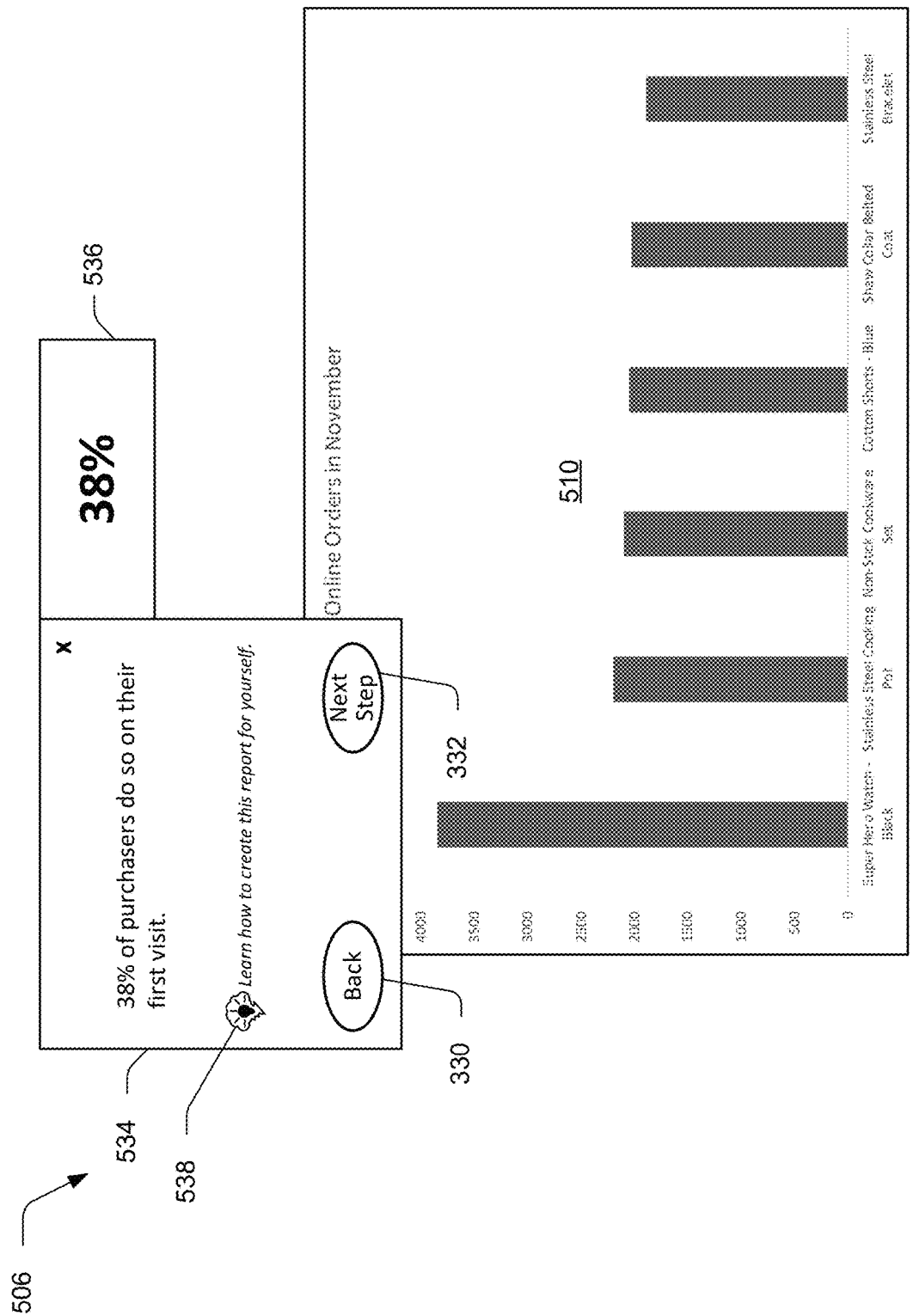
Figure 5S:
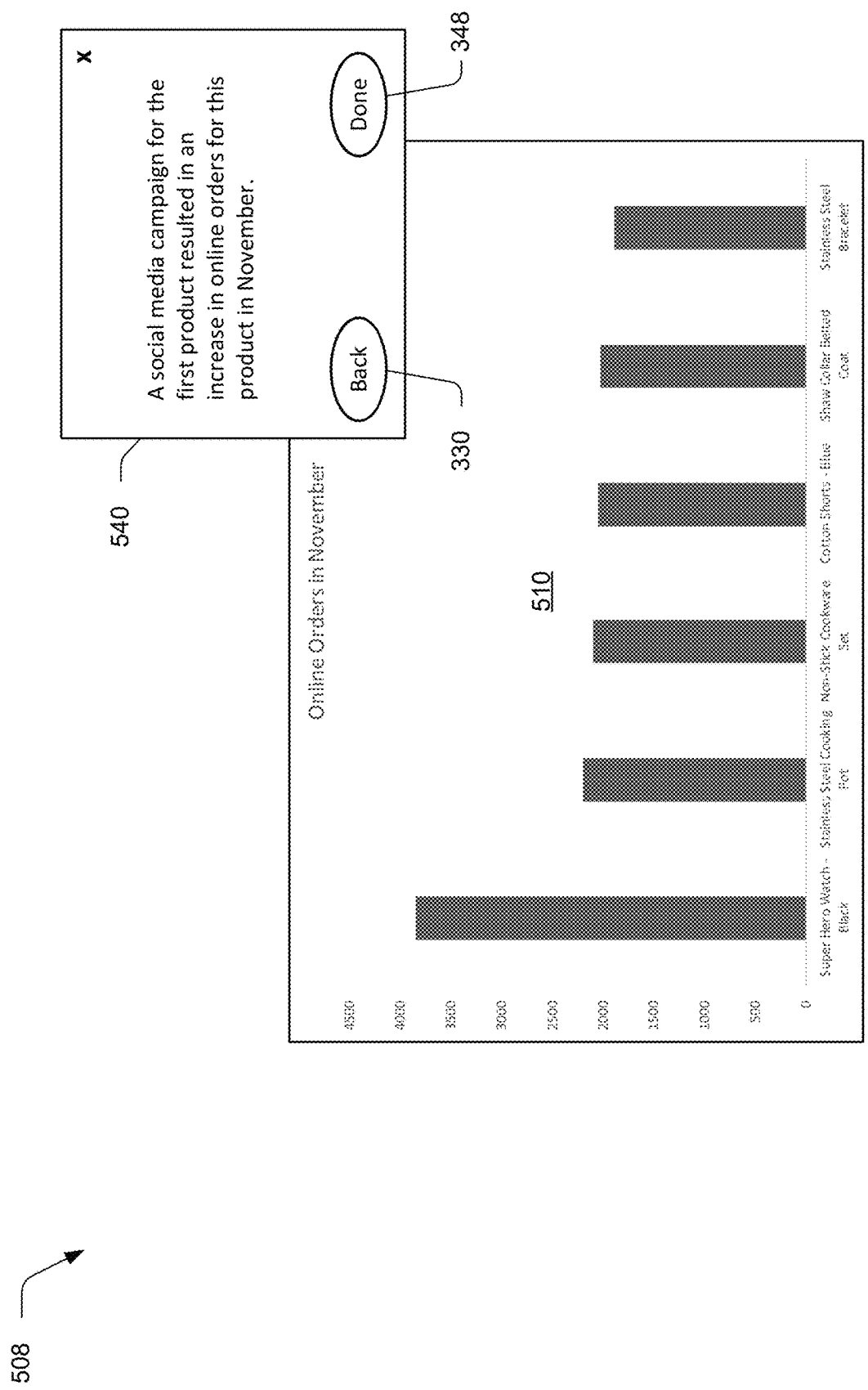

FIGS. 5A, 5B, 5C, 5D, and 5E are illustrations of example representations of sequential supporting answer reports. FIG. 5A illustrates an example representation 500 in which a user input defining a natural language question is received via the user interface component 310. FIG. 5B illustrates an example representation 502 in which a dashboard is displayed including a first report of a sequence of supporting answer reports. FIG. 5C illustrates an example representation 504 in which the dashboard includes a second report of the sequence of supporting answer reports. FIG. 5D illustrates an example representation 506 in which the dashboard includes a third report of the sequence of supporting answer reports. FIG. 5E illustrates an example representation 508 in which the dashboard includes a fourth report of the sequence of supporting answer reports.

As shown in FIG. 5A, the computing device 102 implements the report module 110 to render the user interface component 310 in the representation 500. The representation 500 includes a visual representation 510 of analytics data 112. The user interface component 310 includes recommendations 512-516 for modifying the visual representation 510 of the analytics data 112. The user interface component 310 also depicts relevancy scores 518-522 which correspond to the recommendations 512-516, respectively. As shown, recommendation 512 suggests "RUN PAGEVIEWS REPORT" which has the relevancy score 518 of 31%. Recommendation 514 suggests "CHECK ALERTS" which has the relevancy score 520 of 26%. Recommendation 516 suggests "SHOW TRENDING ORDERS" which has the relevancy score 522 of 18%. For example, the report module 110 determines the relevancy scores 518-522 by processing the input data 114 and/or the analytics data 112 using a machine learning model or multiple machine learning models. In one example, the report module 110 determines the relevancy scores 518-522 by processing the input data 114 and/or the analytics data 112 using statistical modeling and/or a combination of statistical modeling and machine learning.

As further shown in FIG. 5A, the user interface component 310 includes the user input field 324 for receiving a user input defining a question in natural language with respect to the visual representation 510 of the analytics data 112. The user input field 324 can receive this natural language question as textual input and/or as an audio input. As shown, the user input field 324 has received the user input as the natural language question "Explain the performance of the first product." The user input defines the natural language question with respect to the product "Super Hero Watch—Black" which was the subject of a significant number of online orders in November. In response to receiving the user input, the report module 110 generates a sequence of supporting answer reports such that each report of the sequence includes a supporting answer to the question defined by the user input.

FIG. 5B depicts the representation 502 which includes a first report 524 of the sequence of reports. The first report 524 includes a first supporting answer to the natural language question "Explain the performance of the first product." The first report 524 also includes a visual representation 526 of the first supporting answer and an indication of a relationship between the first supporting answer and a final answer to the question. This indication is a natural language explanation of the visual representation 526 of the first supporting answer. As shown, the indication is "There was a steady increase in traffic leading up to Black Friday."

The first report 524 includes the user interface instrumentalities 330, 332. For example, an interaction with the user interface instrumentality 330 is effective to display the user interface component 310 in the representation 502. Interaction with the user interface instrumentality 332 is effective to display a next supporting answer report of the sequence of reports. In response to receiving a user input as an interaction with the user interface instrumentality 332, the report module 110 renders a second report 528 of the sequence of reports.

As shown in FIG. 5C, the representation 504 includes the second report 528 which includes a second supporting answer to the question "Explain the performance of the first product." The second report 528 also includes a visual representation 530 of the second supporting answer to the question and an indication of a relationship between the second supporting answer and the final answer to the question. This indication is a natural language description of the visual representation of the second supporting answer to the question as "Mobile purchases make up 24% of total sales which is 6% higher than average for other products."

In this example, the second supporting answer to the question is not dependent on the first supporting answer to the question. This is because the first supporting answer to the question includes information relating to increases in traffic and the second supporting answer to the question includes information relating to mobile purchases. In other words, the information included in the second supporting answer does not directly augment the information included in the first supporting answer to the question. For example, the first supporting answer to the question and the second supporting answer to the question each contribute to a portion of the final answer independently.

The second report 528 also includes an indication 532 of additional information including "For more information you could run the Segment Comparison tool to better understand these segments." In one example, the report module 110 includes the indication 532 as part of the second report 528 based on the input data 114 and/or the analytics data 112. In this example, processing of the input data 114 and/or the analytics data 112 may suggest that a user associated with the input data 114 is inexperienced using "Segment Comparison." Thus, the report module 110 generates the sequence of reports not only to sequentially provide supporting answers to the question "Explain the performance of the first product" but also to expose additional functionality made available by the report module 110.

The second report 528 includes the user interface instrumentalities 330, 332. For example, an interaction with the user interface instrumentality 330 is effective to display the first report 524. Interaction with the user interface instrumentality 332 is effective to display a next report of the sequence of reports. In response to receiving a user input as an interaction with the user interface instrumentality 332, the report module 110 renders a third report 534.

As shown in FIG. 5D, the representation 506 includes the third report 534 which includes a third supporting answer to the question "Explain the performance of the first product." The third report 534 also includes a visual representation 536 of the third supporting answer and an indication of a relationship between the third supporting answer and the final answer to the question. As illustrated, the indication is a natural language explanation of the visual representation 536 as "38% of purchasers do so on their first visit." The third report 534 also includes an indication 538 of additional information as "Learn how to create this report yourself" In one example, the report module 110 includes the indication 538 as part of the third report 534 based on the input data 114 and/or the analytics data 112.

The third report 534 includes the user interface instrumentalities 330, 332. In one example, an interaction with the user interface instrumentality 330 is effective to display the second report 528. Interaction with the user interface instrumentality 332 is effective to display a next report of the sequence of reports. In response to receiving a user input as an interaction with the user interface instrumentality 332, the report module 110 renders a fourth report 540.

As shown in FIG. 5E, the forth report 540 includes a fourth supporting answer to the question of "Explain the performance of the first product." The fourth supporting answer depicts a natural language explanation of "A social media campaign for the first product resulted in an increase in online orders for this product in November." In the illustrated example, the sequence of reports 524-540 now collectively indicates the final answer to the question.

In response to receiving a user input as an interaction with the user interface instrumentality 330, the report module 110 renders the third report 534, the second report 528, and/or the first report 524 of the sequence of reports. In this way, the relationships between the supporting answers to the question and the final answer to the question are further observable. For example, "Mobile purchases make up 24% of total sales which is 6% higher than average for other products" because the campaign for the first product was a social media campaign and most users of social media do so on a mobile device.

The social media campaign leveraged the date of Black Friday to maximize a return from the campaign because Black Friday is associated with an increase in online sales generally. The social media campaign also leveraged Black Friday against the background of most users being on a paid holiday which increases the likelihood that these uses would interact with social media and be exposed to the campaign. Many of the purchasers do so on their first visit because the campaign is through social media and if users has previously visited they would have been likely to purchase the first product during that previous visit. The report module 110 receives a user input as an interaction with user interface instrumentality 348, and this interaction is effective to end the sequence of supporting answer reports.

Example System and Device

Figure 6:
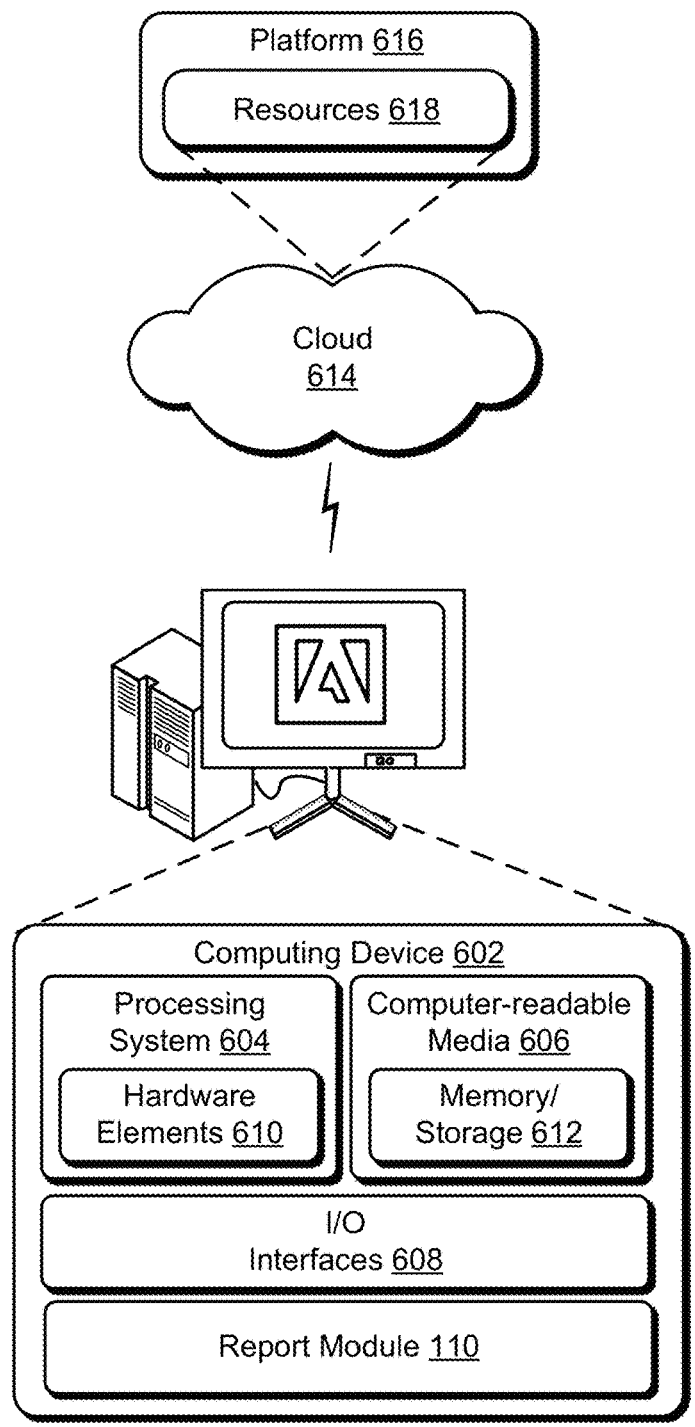
FIG. 6 illustrates an example system that includes an example computing device that is representative of one or more computing systems and/or devices that may implement the various techniques described herein.

FIG. 6 illustrates an example system 600 that includes an example computing device that is representative of one or more computing systems and/or devices that may implement the various techniques described herein. This is illustrated through inclusion of the report module 110. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources 618 and functions to connect the computing device 602 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although implementations of systems for generating sequential supporting answer reports have been described in language specific to structural features and/or methods, it is to be understood that the appended claims are not necessarily limited to the specific features or methods described. Rather, the specific features and methods are disclosed as example implementations of systems for generating sequential supporting answer reports, and other equivalent features and methods are intended to be within the scope of the appended claims. Further, various different examples are described and it is to be appreciated that each described example can be implemented independently or in connection with one or more other described examples.

What is claimed is:

1. A method comprising:
representing, by a processing device, input data describing a natural language question with respect to a representation of analytics data as a question triple;
computing, by the processing device, match scores for candidate answer triples by processing the question triple and the candidate answer triples using a machine learning model;
generating, by the processing device, a sequence of reports based on the match scores, the sequence defining an order of progression from a first supporting answer to a final answer for the natural language question; and generating, by the processing device, an indication of a first report of the sequence for display in a user interface, the first report depicting a visual representation of the first supporting answer.

2. The method as described in claim 1, wherein the match scores are computed using weighted alignment scores for the candidate answer triples and the question triple.

3. The method as described in claim 1, wherein the first report includes a natural language explanation of the visual representation of the first supporting answer.

4. The method as described in claim 1, wherein the first report includes an indication of an analytics tool usable to determine the first supporting answer.

5. The method as described in claim 4, wherein the first report includes a user interface instrumentality selectable to display a tutorial explaining a use of the analytics tool.

6. The method as described in claim 1, wherein the input data is received relative to a user interface component that includes an indication of a recommendation for modifying the representation of the analytics data.

7. The method as described in claim 6, wherein the recommendation is based on interaction data describing user interactions with the analytics data.

8. The method as described in claim 1, wherein a second report included in the sequence of reports depicts a visual representation of a second supporting answer that is dependent on the first supporting answer.

9. The method as described in claim 1, wherein a second report included in the sequence of reports depicts a visual representation of a second supporting answer that is independent of the first supporting answer.

10. A system comprising:
a memory component; and
a processing device coupled to the memory component, the processing device to perform operations comprising:
receiving a question triple that describes relationships between terms of a question about a representation of analytics data;
computing match scores based on the question triple and candidate answer triples using a machine learning model;
generating a sequence of reports and a final answer to the question based on the match scores, the sequence defining an order of progression from a first supporting answer to the final answer; and
generating an indication of a first report of the sequence for display in a user interface, the first report depicting a visual representation of the first supporting answer.

11. The system as described in claim 10, wherein the match scores are computed using weighted alignment scores for the candidate answer triples and the question triple.

12. The system as described in claim 10, wherein the first report includes a natural language explanation of the visual representation of the first supporting answer.

13. The system as described in claim 10, wherein the first report includes an indication of an analytics tool usable to determine the first supporting answer.

14. The system as described in claim 13, wherein the first report includes a user interface instrumentality selectable to display a tutorial explaining a use of the analytics tool.

15. The system as described in claim 10, wherein the question triple is received relative to a user interface component that includes an indication of a recommendation for modifying the representation of the analytics data.

16. A non-transitory computer-readable storage medium storing executable instructions, which when executed by a processing device, cause the processing device to perform operations comprising:
representing input data describing a natural language question with respect to a representation of analytics data as a question triple;
computing match scores for candidate answer triples by processing the question triple and the candidate answer triples using a machine learning model;
generating a sequence of reports based on the match scores, the sequence defining an order of progression from a first supporting answer to a final answer for the natural language question; and
generating an indication of a first report of the sequence for display in a user interface, the first report depicting a visual representation of the first supporting answer.

17. The non-transitory computer-readable storage medium as described in claim 16, wherein a second report included in the sequence of reports depicts a visual representation of a second supporting answer that is dependent on the first supporting answer.

18. The non-transitory computer-readable storage medium as described in claim 16, wherein a second report included in the sequence of reports depicts a visual representation of a second supporting answer that is independent of the first supporting answer.

19. The non-transitory computer-readable storage medium as described in claim 16, wherein the input data is received relative to a user interface component that includes an indication of a recommendation for modifying the representation of the analytics data.

20. The non-transitory computer-readable storage medium as described in claim 19, wherein the recommendation is based on interaction data describing user interactions with the analytics data.

* * * * *